United States Patent [19]

Miyazaki

[11] 4,028,735
[45] June 7, 1977

[54] HEAD INDEXING APPARATUS FOR A COMBINED TWO AND FOUR CHANNEL TAPE PLAYER/RECORDER

[75] Inventor: Toru Miyazaki, Iwaki, Japan

[73] Assignee: Alps Motorola, Inc., Tokyo, Japan

[22] Filed: Sept. 15, 1975

[21] Appl. No.: 613,712

[30] Foreign Application Priority Data
Sept. 17, 1974 Japan .................. 49-111888[U]

[52] U.S. Cl. .............................. 360/106; 360/93; 360/78
[51] Int. Cl.² ................. G11B 5/55; G11B 21/08; G11B 23/04
[58] Field of Search ............ 360/106, 78, 93, 94, 360/109, 105

[56] References Cited
UNITED STATES PATENTS

| | | | |
|---|---|---|---|
| 3,492,005 | 1/1970 | Uno et al. | 360/78 |
| 3,507,501 | 4/1970 | Lear | 360/78 |
| 3,632,114 | 1/1974 | Ban | 360/78 |
| 3,787,058 | 1/1974 | Lyon, Jr. | 360/106 |
| 3,925,818 | 12/1975 | Tahara | 360/78 |

OTHER PUBLICATIONS
B487,411, Feb. 2, 1976, Nishinakagawa, 360/78.

*Primary Examiner*—Alfred H. Eddleman
*Attorney, Agent, or Firm*—James W. Gillman; Phillip Melamed; Donald J. Lisa

[57] ABSTRACT

A combined two (stereo) and four (quadraphonic) channel tape recorder is disclosed which can use both two and four channel eight track magnetic tape cartridges. The tape recorder includes a head positioning rotary body having four fixed rotary positions and a selection means for selecting two of these four fixed rotary positions when four channel (quadraphonic) operation is desired. The selection means comprises a rotary switch rotated in association with the rotation of the head positioning rotary body and an additional switch connected in series with the rotary switch and actuated by each rotation of the rotary body. Thus a single tape recorder capable of playing stereophonic and quadraphonic magnetic tape cartridges has been provided.

9 Claims, 6 Drawing Figures

U.S. Patent
June 7, 1977
4,028,735
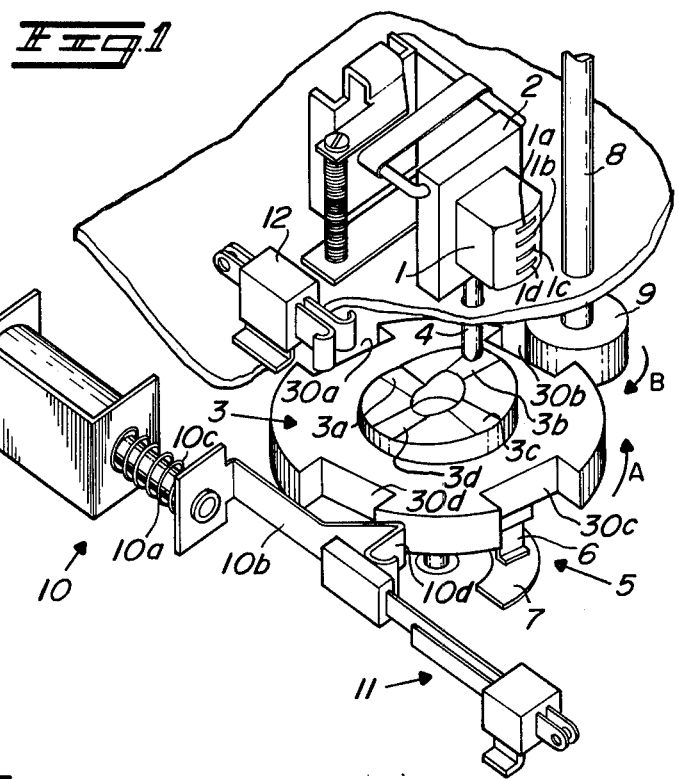
Fig. 1
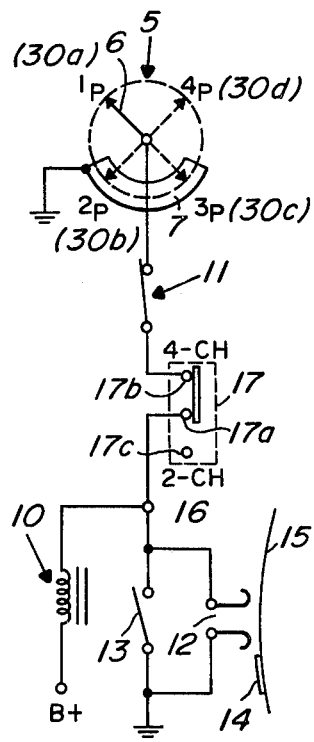
Fig. 2
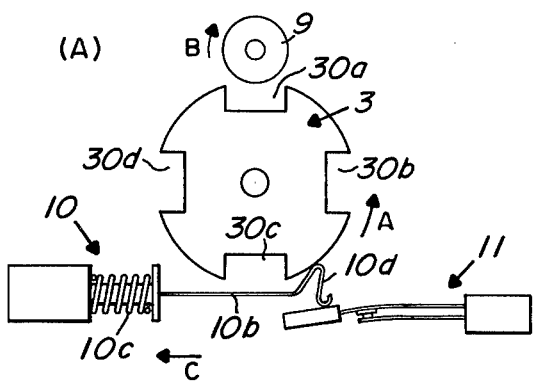
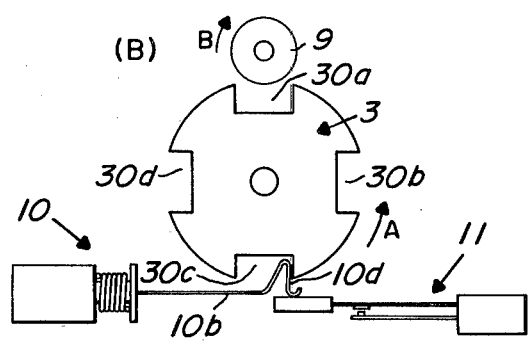
Fig. 3
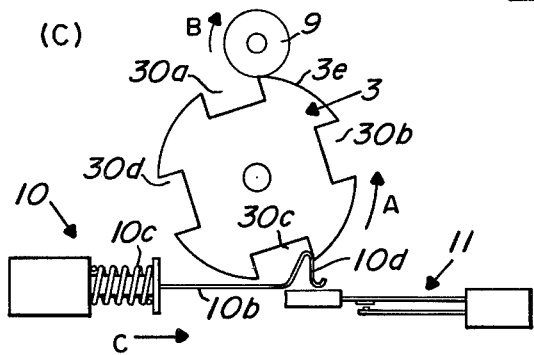
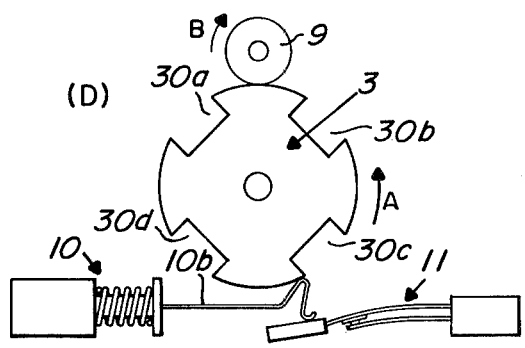

HEAD INDEXING APPARATUS FOR A COMBINED TWO AND FOUR CHANNEL TAPE PLAYER/RECORDER

BACKGROUND OF THE INVENTION

1. Field of the Invention

The present invention is related to the field of two channel tape recorders which can be converted to four channel operation.

2. Description of the Prior Art

Two channel tape recorders are designed so that a magnetic head is moved up and down to monitor pairs of track information which exist on a magnetic tape. Normally, eight tracks of information are provided on a tape. The first and fifth tracks are monitored first, the second and sixth tracks are monitored second, the third and seventh tracks are monitored third, and the fourth and eighth tracks are monitored last.

In four channel tape recorders the magnetic head is designed to simultaneously monitor four tracks of information on the magnetic tape. Normally, the first, third, fifth and seventh tracks are monitored first and the second, fourth, sixth and eighth tracks are then monitored.

A typical prior head indexing system which can be readily adapted for combined quad and stereo tape players used two coaxially mounted cam surfaces which were selectively coupled to the magnetic head depending upon whether a four or eight track tape cartridge was inserted. Such a system is described in U.S. Pat. No. 3,787,058. This system requires two sets of precision cam surfaces and clutch mechanisms to shift the coaxially mounted cam surfaces.

SUMMARY OF THE INVENTION

It is an object of this invention to provide an improved two and four channel tape player which can be simply and economically constructed.

In one embodiment of the present invention, a combined two and four channel tape player is provided. The tape player comprises: a rotary body rotatable into a first number of fixed rotary positions and having a plurality of different cam surfaces; a magnetic head for monitoring a magnetic tape, the head coupled to the rotary body and having its position determined by the rotary position of the rotary body; rotation apparatus coupled to the rotary body for sequentially indexing the rotary body into each of the first number of fixed rotary positions in response to the receipt of an actuation signal; actuation apparatus coupled to the rotation apparatus for providing an initial actuation signal when a change in the position of the magnetic head means is desired; and selected apparatus coupled to the rotation apparatus for selectively designating several of the first number of rotary positions as desired positions and controlling, by selectively creating additional actuation signals, the rotation of said rotary body by said rotation means, whereby the rotary body is sequentially rotated into each of the desired positions in response to the providing of an initial actuation signal by the actuation apparatus.

BRIEF DESCRIPTION OF THE DRAWINGS

For a more complete understanding of the invention reference should be made to the drawings, in which:

FIG. 1 is a perspective view illustrating the head indexing apparatus of a combined two and four channel tape player constructed according to the present invention;

FIG. 2 is a schematic circuit diagram of the magnetic head indexing apparatus illustrated in FIG. 1; and FIGS. 3A–3D are top plane views of the magnetic head indexing apparatus shown in FIGS. 1 and 2.

DESCRIPTION OF THE PREFERRED EMBODIMENT

A magnetic head 1 is illustrated in FIG. 1 as having four head monitoring units 1a, 1b, 1c, and 1d. The magnetic head is attached to a holding frame 2 which is coupled to the upper portion of a rotary body 3 through a pin 4. The upper portion of the rotary body 3 has four cam surfaces 3a, 3b, 3d, 3c and 3d, each of which is adapted for adjusting the height of the magnetic head 1 to a different vertical position through the contact with the pin 4. The rotary body 3 has four notches 30a, 30b, 30c, and 30d formed in a peripheral edge thereof. The rotary body 3 is illustrated in FIG. 1 as having cam surface 3b in contact with the pin 4.

A rotary switch generally indicated by the reference number 5 is mounted on the underside of the rotary body 3 and has an electrode 6 which rotates in association with the rotation of the rotary body 3 and slideably contacts a conductive pattern 7 formed on a chassis or suitable panel. A capstan shaft 8, having one end secured to a fly wheel driven by a motor (not shown), has a ring 9, formed of an elastic material such as rubber, fastened to it. The ring 9 is normally opposed to one of the notches (30a–30d) formed in the rotary body 3. In FIG. 1, the notch 30b is opposite the ring 9.

A solenoid device generally indicated by the reference number 10 includes a plunger 10a, a lever 10b, and a returning spring 10c. The lever 10b is formed of an elastic material, such as metal, and has a nose portion 10d normally placed in contact with the peripheral edge of the rotary body 3. A leaf switch 11 is positioned so that it may be turned on and off by the motion of the nose portion 10d of the lever 10b. A contact switch 12 is mounted on a chassis and is provided to sense a conductive foil 14 placed near the end of a magnetic tape 15 to be monitored.

The general operation of the magnetic head indexing system shown in FIG. 1 is that the solenoid device 10 initially will cause the rotation of the rotary body 3 in the direction designated by the arrow A. This initial rotation will cause the ring 9, rotated by the capstan shaft 8 in the direction designated by the arrow B, to engage the peripheral edge of the rotary body 3 and index the rotary body so as to position the notch 30c opposite to the ring 9. Such a head indexing system which is rotated by the capstan shaft is illustrated in U.S. Pat. No. 3,877,071 which is assigned to the same assignee as the present invention. However, this prior patent does not illustrate apparatus for converting a two channel tape player into a four channel tape player.

FIG. 2 is a schematic diagram of the tape head indexing system as shown pictorially in FIG. 1. Identical reference numbers are used to designate corresponding parts which are common to both FIGS. 1 and 2. In FIG. 2, a manual switch 13 is shown in parallel with the contact switch 12. The contact switch 12 senses when a conductive foil 14 placed near the end of a magnetic tape 15 comes in contact therewith. Such contact switches are commonly used to sense the end of a magnetic tape and thereby index the magnetic tape head to the next desired track. The manual switch 13 represents an operator actuated switch which can also index the tape head positioning mechanism from one track to another. The solenoid device 10 is illustrated as an electromagnetic coil connected between a B+ terminal and a terminal 16 which serves as the high side terminal of switches 12 and 13. The low side terminal of switches 12 and 13 is directly connected to ground.

A slide switch 17 has a center terminal 17a, an upper terminal 17b (corresponding to the selection of four channel operation) and a lower terminal 17c (corresponding to two channel operation). Terminal 16 is directly connected to the center terminal 17a, terminal 17c is open circuited, and terminal 17b is connected to the electrode 6 of the rotary switch 5 through the leaf switch 11. Four fixed rotary positions of the electrode 6 of the rotary switch 5 are designated by dashed arrows and the reference numbers 1P through 4P. Each of the positions 1P through 4P corresponds to one the notches 30a-30d, respectively, being positioned opposite to the ring 9. The conductive pattern 7 of the rotary switch 5 is connected to ground and positioned such that the electrode 6 will be connected to ground when the rotary switch 5 is in positions 2P and 3P.

The slide switch 17 is illustrated in FIG. 2 in a position where the terminal 17a and 17b are shorted together. And thus a four channel mode of operation is selected for the head indexing system illustrated in FIG. 1. The switches 12 and 13 form part of an actuation means which provides an initial actuation (ground) signal to the solenoid 10 that results in the indexing of the rotary body 3 which in turn indexes the magnetic head 1. The rotary switch 5, the leaf switch 11 and the selection switch 17 all form part of a selection means which selects the positions 1P and 4P as desired positions for a four channel mode of operation and controls the rotation of the rotary body 3, by creating additional actuation signals at terminal 16, so that the rotary body is sequentially rotated between positions 1P and 4P in response to the initial providing of an actuation signal by one of the switches 12 or 13.

The slide switch 17 can be manually moved into either the four channel or the two channel selection position. The mode of operation of the switch 17 can also be determined by a sensing device in the tape player which senses if a four channel or two channel tape cartridge is inserted into the tape player and moves the switch 17 accordingly.

FIGS. 3A through 3D are top plane sequential views which illustrated the rotational motion of the inventive head indexing system for a two and four channel tape player. Identical reference numbers are used for components which are common to FIGS. 3A-3D and either of the preceding figures. The sequential operation of the combined two and four channel tape player will now be discussed in detail.

When a four channel tape cartridge is loaded into the tape player, the selection switch 17 is positioned as illustrated in FIG. 2 with the terminals 17a and 17b shorted together. The electrode 6 of the rotary switch 5 is assumed to be positioned at the position 1P. In this position the second, fourth, sixth and eighth tracks on the magnetic tape 15 are monitored by the tape head 1. Throughout this monitoring the head indexing mechanism is positioned as illustrated in FIG. 3A with notch 30a opposite the ring 9.

When the monitoring of the magnetic tape 15 is completed, the contact switch 12 is momentarily closed by the conductive foil 14. This results in the actuation of the solenoid device 10 which magnetizes the lever 10b, thereby compressing the spring 10c and moving the level 10b in the direction indicated by the arrow C in FIG. 3A. This results in the nose portion 10d falling into the notch 30c of the rotary body 3. This position of the head indexing mechanism is illustrated in FIG. 3B.

In FIG. 3A the nose 10d is shown forced into contact with the leaf spring switch 11 by the peripheral edge of the rotary body 3. This results in the closing of the switch 11. When the nose 10d is positioned in one of the notches 30a-30d, the nose is no longer forced against the leaf switch 11 and the switch is now in an open position, as illustrated in FIG. 3B.

The magnetic tape 15 continues to be rotated by the motion of the capstan shaft 8 and this results in the subsequent opening of the contact switch 12 since the conductive foil 14 is moved past this switch. Therefore the solenoid device 10 is deactivated and the rotary body 3 is initially rotated by the spring 10c moving of the lever arm 10b.

The position of the head indexing mechanism just after the deactuation of the solenoid device 10 is illustrated in FIG. 3C. In this figure the rotary body 3 has been rotated in the direction A such that its peripheral edge (3e) is now in contact with the ring 9 which is being driven by the capstan shaft 8. The result is that the rotary body 3 will now be rotated by the ring 9 in the direction A until the notch 30b is opposite to the ring 9.

FIG. 3D illustrates the position of the head indexing mechanism after a partial rotation of the rotary body 3 by the ring 9. This rotation has caused the peripheral edge of the rotary body 3 to again contact the nose 10d and force this member against the leaf switch 11 resulting in the closing of this switch. FIG. 3D therefore illustrates that the leaf switch 11 will be actuated by each rotation of the rotary body 3 by the ring 9.

Each time the rotary body 3 is rotated into a new rotary position, a different cam surface (3a-3d) is brought into contact with the pin 4 which in turn adjusts the vertical height of the magnetic tape head 1. Therefore for each fixed rotary position of the rotary body 3, the magnetic head 1 is adjusted to a different vertical position.

In standard two channel operation, the magnetic tape head 1 is sequentially indexed through four different vertical positions and then returned to the original position. For two channel operation the switch 17 is positioned such that the terminal 17a is connected to terminal 17c. Thus the occurrence of an actuation (grounding) signal at terminal 16 occurs only when the conductive foil on the end of the magnetic tape contacts the switch 12 or when the manual indexing switch 13 is actuated.

For four channel operation, the magnetic head 1 should be positioned in two, instead of four, vertical positions. Therefore the present invention provides for skipping the fixed rotary positions 2P and 3P when four channel operation is desired.

With switch 17 in its four channel position and the rotary body 3 in position 1P, the electrode 6 is not in contact with the grounded conductor strip 7. When a conductive foil actuates the contact switch 12, the solenoid 10 is magnetized and subsequently demagnetized resulting in the rotation of the rotary body 3 into position 2P. However, in position 2P the switch 11 is closed by the action of the peripheral edge of the rotary body 3 against the nose 10d. In addition, the electrode 6 is now contacting the grounded metal strip 7. This results in the creation of an additional grounding signal at terminal 16 which again commences the rotation of the rotary body 3 as illustrated in FIGS. 3A through 3D. In this case, however, the solenoid device 10 is deactivated by the opening of the leaf switch 11 rather than the opening of the contact switch 12. A similar rotation will occur when the rotary body is in position 3P and the rotation of the rotary body 3 will finally stop when the body is indexed into the position 4P.

When the contact switch 12 is again actuated by a conductive foil, the rotary body will be indexed from position 4P to position 1P and no additional rotation will occur since the electrode 6 will not be in contact with the grounded metal strip 7. Thus in the four channel mode of operation the inventive head indexing system indexes the head between positions 1P and 4P, while in the two channel mode of operation the head indexing system in rotated into each of the four fixed rotary positions in response to the receipt of an initial actuation signal at the terminal 16.

Thus a combined two and four channel tape player has been provided in which a selection means, including a rotary switch and a selection switch, has selected several of a number of fixed rotary positions as desired positions and controlled the rotation of a rotary body so that the rotary body is sequentially rotated into each of said desired positions in response to the providing of an initial actuation signal by an actuation means which includes an end of tape sensor switch 12 and a manual indexing switch 13. The present invention provides a simplified apparatus for modifying the operation of a prior head indexing system so as to provide two and four channel operation from a single tape player.

While I have shown and described specific embodiments of this invention, further modifications and improvements will occur to those skilled in the art. All such modifications which retain the basic underlying principles disclosed and claimed herein are within the scope of this invention.

I claim:

1. In a combined two and four channel tape player, a head indexing apparatus comprising:
   a rotary body rotatably into a first number of fixed rotary positions and having a plurality of different cam surfaces;
   magnetic head means for monitoring a magnetic tape, said head means coupled to said rotary body and having its position determined by the rotary position of said rotary body;
   rotation means coupled to said rotary body for sequentially indexing said body into each of said first number of fixed rotary positions in response to the receipt of an actuation signal;
   actuation means coupled to said rotation means for providing an initial actuation signal when a change in the position of the magnetic head means is desired; and
   selection means coupled to said rotation means for selectively designating several of said first number of rotary positions as desired positions and controlling, by selectively creating additional actuation signals, the rotation of said rotary body by said rotation means so that said rotary body is sequentially rotated into each of said desired positions in response to the providing of said initial actuation signal by said actuation means, said selection means including a portion of a rotary switch rotated in association with said rotary body and an additional switch electrically connected in series with said rotary switch and being actuated during the rotation of said rotary body into each of said first number of positions, said rotary switch and said additional switch creating said additional actuation signals.

2. In a combined two and four channel tape player, a head indexing apparatus according to claim 1 where said rotary switch has a metallic conductive pattern for preventing a plurality of said first number of fixed rotary positions which are adjacent to each other from being selected as said desired positions of said rotary body, said conductive pattern disposed for providing a constant electrical state for said rotary switch in and continuously between said plurality of positions.

3. In a combined two and four channel tape player, a head indexing apparatus according to claim 1 wherein said rotary body has a peripheral edge and said additional switch is mechanically coupled to said peripheral edge during the rotation of said rotary body and said actuation of said additional switch is caused by the rotation of said rotary body.

4. In a combined two and four channel tape player, a head indexing apparatus according to claim 3 wherein said rotation means includes a solenoid device having a lever with a portion for selectively engaging the peripheral edge of said rotary body and initially rotating said rotary body in response to said actuation signals.

5. In a combined two and four channel tape player, a head indexing apparatus according to claim 4 wherein said additional switch is mechanically coupled to the peripheral edge of said rotary body through said portion of said lever of said solenoid device.

6. In a combined two and four channel tape player, a head indexing apparatus according to claim 5 wherein said additional switch is a leaf spring switch.

7. In a combined two and four channel tape player, a head indexing apparatus according to claim 3 wherein said rotary switch has a metallic conductive pattern for preventing a plurality of said first number of fixed rotary positions which are adjacent to each other from being selected as said desired positions of said rotary body, said conductive pattern disposed for providing a constant electrical state for said rotary switch in and continuously between said plurality of positions.

8. In a combined two and four channel tape player, a head indexing apparatus according to claim 7 wherein said first number of fixed rotary positions is four and wherein said several of said first number of fixed rotary positions is two.

9. In a combined two and four channel tape player, a head indexing apparatus according to claim 8 wherein said rotation means includes a ring selectively coupled to said peripheral edge of said rotary body for selectively transmitting the rotational motion of the capstan shaft of the tape player to the rotary body.

* * * * *